United States Patent [19]

Takahashi et al.

[11] 3,936,618

[45] Feb. 3, 1976

[54] MULTICHANNEL RECORD DISC REPRODUCING SYSTEM AND APPARATUS

[75] Inventors: Nobuaki Takahashi, Yamato; Hideo Onoye, Yokohama; Teruo Muraoka; Masao Kasuga, both of Sagamihara, all of Japan

[73] Assignee: Victor Company of Japan, Limited, Yokohama, Japan

[22] Filed: Mar. 6, 1974

[21] Appl. No.: 448,732

[30] Foreign Application Priority Data

Mar. 9, 1973 Japan .............................. 48-27715

[52] U.S. Cl. ..................179/100.4 ST; 179/1 GQ; 179/100.1 TD

[51] Int. Cl.$^2$........................ G11B 3/00; G11B 3/74

[58] Field of Search ... 179/1 GO, 15 BT, 100.1 TD, 179/100.4 ST; 329/122; 331/25

[56] References Cited

UNITED STATES PATENTS

| | | | |
|---|---|---|---|
| 3,209,271 | 9/1965 | Smith | 329/122 |
| 3,371,281 | 2/1968 | Powell | 329/122 |
| 3,686,471 | 8/1972 | Takahashi | 179/100.4 ST |
| 3,778,728 | 12/1973 | Napp | 329/122 |

*Primary Examiner*—Bernard Konick
*Assistant Examiner*—Stewart Levy

[57] ABSTRACT

A multichannel record disc reproducing system and apparatus comprises a phase-locked loop for demodulating an angle-modulated wave signal in a multiplexed signal picked up from a multichannel record disc. A synchronous detector compares the phases of the angle-modulated wave signal and an output signal of a voltage-controlled oscillator in the phase-locked loop. The detector produces an output signal when there is a noise component in the angle-modulated wave signal. A circuit, controlled by the output of the synchronous detector, provides a demodulated output signal having at least one attenuated frequency band, in which a noise component is greatly reduced.

15 Claims, 16 Drawing Figures

MULTICHANNEL RECORD DISC REPRODUCING SYSTEM AND APPARATUS

BACKGROUND OF THE INVENTION

This invention relates generally to a multichannel record disc reproducing system and apparatus, and more particularly, to a system and apparatus for reproducing multichannel record discs, while restraining or suppressing noise components in the demodulation.

A discrete four-channel record disc system was previously proposed by one of the present applicants, Nobuaki Takahashi and was patented in the United States as U.S. Pat. No. 3,686,471. Here, a direct wave is formed from the sum signal of a pair of two channels. An angle-modulated wave is obtained by angle modulating a 30 KHz carrier wave, responsive to a difference signal derived from a pair of two channels. The direct and carrier waves are multiplexed and recorded on the respective side walls of the disc sound groove.

In picking up and reproducing a recorded signal from this multichannel record, there is a need for taking out the angle-modulated difference signal from the picked up signal. It is separated from the direct wave sum signal, in order to demodulate the angle-modulated difference signal. It is to be understood that the direct wave sum signal has a frequency band ranging from 0 to 15 KHz, while the angle-modulated difference signal has a frequency band ranging from 20 KHz to 45 KHz.

In general, abnormal noises, generated at the time of the reproducing of a multichannel record disc, can be classified broadly into the following two kinds, depending on the cause.

1. Abnormal noise is caused by wear of the sound groove of the disc. The carrier level of the angle-modulated wave drops greatly. The noise level becomes higher than the carrier level.

2. Abnormal noise is caused by the nonlinearity of the mechanical systems of the cutter in the recording system, the pickup in the reproducing system, and sound groove of the record disc when the level of the direct wave sum signal is extremely high, and particularly when the level of the high-frequency component is high.

One of the present applicants, Nobuaki Takahashi, has previously proposed various systems for preventing the reproduction and generation of the above enumerated noises, in demodulated signals. For example, if an angle-modulated wave is partially lacking, there is an equivalent of a deviation of the angle-modulated wave to a low frequency. For this reason, in one proposed system, this frequency deviation is detected, and muting is applied responsive thereto in order to shut off the signal. In another system, the above mentioned deviation toward the low frequency is detected. In response to the resulting detection output, the loop gain of a phase-locked is decreased thereby to constrict the lock range and thereby to prevent the phase-locked loop from locking to the noise component.

In accordance with these prior proposed systems, impulse noises, arising from causes such as scratches and dust in the disc sound groove, are effectively suppressed with no great problems. However, if the level of a sum signal is high, particularly in a high frequency band, the angle-modulated wave signal is continuously disturbed. The application of one of the above mentioned proposed systems continuously gives rise to an attenuation or a cutting off of the difference signal component. High fidelity reproducing cannot then be carried out. Furthermore, these proposed systems are also accompanied by other problems, such as unsatisfactory sound source localization.

SUMMARY OF THE INVENTION

Accordingly, a general object of the present invention is to provide a new and useful multichannel record disc reproducing system and apparatus in which the above described difficulties have been overcome.

A specific object of the invention is to provide a multichannel record disc reproducing system and apparatus, adapted to carry out reproducing by attenuating the level of a specific frequency band of a demodulated signal, at the time when a noise component is present.

Another object of the invention is to provide a multichannel record disc reproducing system and apparatus wherein, noise components are detected and suppression of noise generation is effected responsive to a synchronous detector.

Still another object of the invention is to provide a multichannel record disc reproducing system and apparatus wherein, the presence of a noise component can be accurately and positively detected. The level of a demodulation output signal is attenuated over a specific frequency band or over all frequency bands during a short time substantially equal to the period during which that noise is present.

Other objects and further features of the invention will be apparent from the following detailed description with respect to preferred embodiments of the invention when read in conjunction with the accompanying drawings.

DETAILED DESCRIPTION

Figure 1:
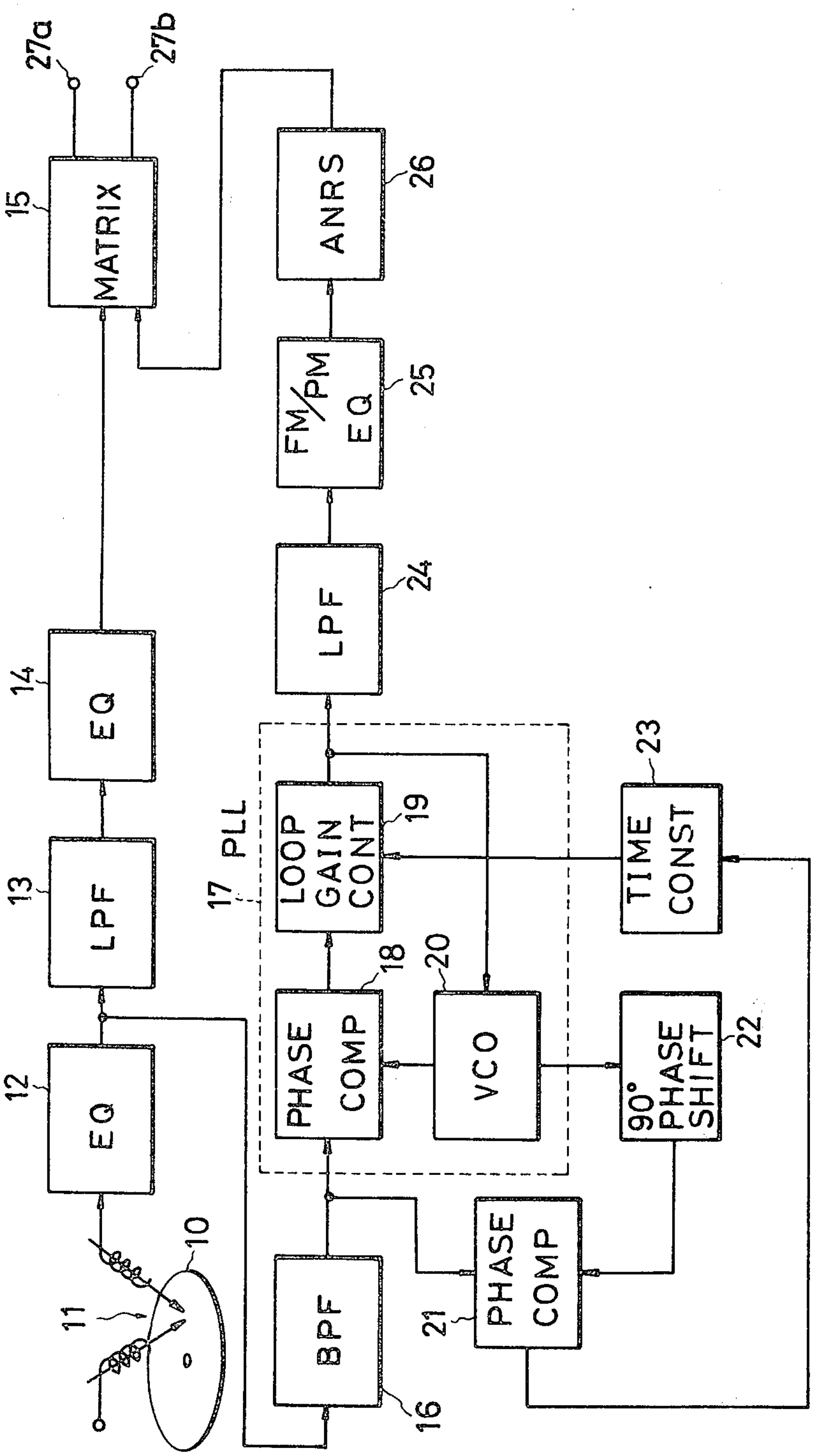
FIG. 1 is a block diagram showing the essential arrangement of a first embodiment of a multichannel record disc reproducing system or apparatus according to the present invention.

From FIG. 1, it will be seen that a multiplexed signal of a direct wave sum signal and an angle-modulated difference signal of each pair of two channels is recorded on each side wall of the sound groove of a four-channel record disc 10, thereby recording the signals for a total of four channels. A multiplexed signal comprising the direct wave sum signal and the angle-modulated wave difference signal, for the two-channel signal, is picked up from the left wall of the grooves of the disc 10 by a pickup cartridge 11. The picked up signal is fed to an equalizer 12, having an RIAA (Recording Industries of America) turnover characteristic, for equalization.

The resulting signal is fed to a low-pass filter 13 for an elimination of the angle-modulated wave component and for deriving only the direct wave sum signal component. The direct wave sum signal is fed to a matrix circuit 15, via a equalizer 14 provided with the RIAA roll-off characteristic.

The output of the equalizer 12 is partly fed to a band-pass filter 16 (or high-pass filter) with a passband in the approximate range of from 20 KHz to 45 KHz. An angle-modulated wave difference signal is derived from this filter. To provide demodulation, the angle-modulated wave difference signal is fed to a phase locked loop (PLL) circuit 17 containing a phase comparator 18, a loop gain control circuit 19 and a voltage-controlled oscillator 20, etc.

The demodulated output from the PLL circuit 17 is supplied to a low-pass filter 24, and the unwanted components contained in the output are eliminated thereat. The output from the low-pass filter 24 is fed to the matrix circuit 15 via (in succession) an FM/PM equalizer 25 and an automatic noise reduction system (ANRS) circuit 26 comprising an expandor, which has a characteristic that compensates for the characteristic of a compressor in the recording system.

In the matrix circuit 15, the direct wave sum signal from the equalizer 14 and the demodulated difference signal from the ANRS circuit 26 are matrixed. From output terminals 27*a* and 27*b* are derived, for instance, the left front (the first channel) and the left rear (the second channel) signals, respectively.

FIG. 1 shows only the circuit system for the first and second channel signals (the left channel system for the grooves of the disc 10). Exactly the same circuit system is duplicated for the right front (the third) and the right rear (the fourth) channel. Detailed illustration and description of this same system are omitted herein.

Figures 2A, 2B, 2C, 2D:
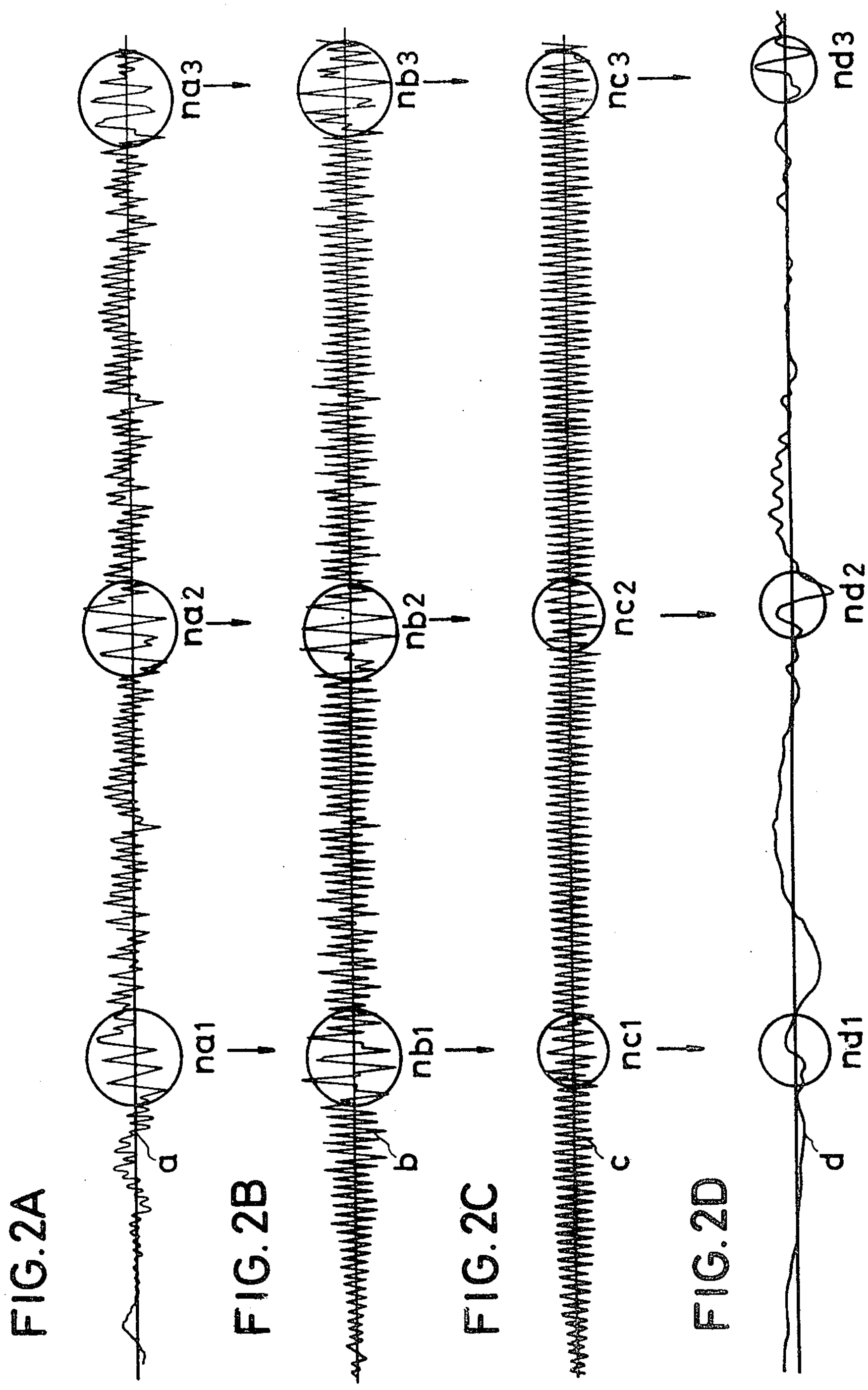
FIGS. 2A through 2D, inclusive, are signal waveform graphs for a description of respective states of noise generation.

If the output signal of the equalizer 12 is a signal *a* of the waveform indicated in FIG. 2A, and is a signal having noise components as indicated by reference designations *nal*, *na*2, and *na*3, and if a conventional phase locked loop (PLL) is used as the PLL 17, the input signal to the PLL is a signal *b* of a waveform, as indicated in FIG. 2B. The output signal of a voltage controlled oscillator in the PLL will become a signal *c* of the waveform indicated in FIG. 2C. Furthermore, the demodulated output signal of the PLL will become the signal *d* of the waveform indicated in FIG. 2D.

As is apparent from these figures, when noise components *na*1, *na*2, and *na*3 are in the input signal *a*, noise components *nb*1, *nb*2, and *nb*3 and *nc*1, *nc*2, and *nc*3 remain also in the signals *b* and *c*. As a result, noise components *nd*1, *nd*2, and *nd*3 also appear in the demodulated output signal *d*.

As is apparent from this, the instant at which noise is generated is not the instant at which the level of the input signal becomes zero, but is the instant when the angle-modulated wave component is relatively replaced by another and interfering signal wave. Moreover, when the level of this substituted signal wave component reaches a value in the same order as the value of the angle-modulated wave component or a higher value, it becomes a serious problem.

The above mentioned noise component is an abnormal phenomenon part occurring with a width of, for example, 0.2 msec. (200 $\mu$ sec.) for every 1.8 msec. For example, with respect to the signal *a*, with parts *na*1, *na*2, and *na*3, the component of frequencies from 10 KHz to 15 KHz is greater than the component of the frequency 30 KHz. Furthermore, with respect to the signal *b*, obtained by extracting only the components of 20 KHz to 45 KHz, from the above mentioned signal *a* by means of a band-pass filter, the component of low frequency is still greater than the component of 30 KHz. This corresponds to the state wherein the angle-modulated wave is replaced by another and interfering signal of lower frequency differing from the angle-modulated wave in the parts *nb*1, *nb*2, and *nb*3 of the signal *b*. Furthermore, the output signal *c*, of a voltage controlled oscillator is lowered in frequency, at the position of the parts *nc*1, *nc*2, and *nc*3. This oscillator is in the PLL circuit having the phase comparator to which this signal is also lowered in frequency at the position. This is because the PLL has locked to a frequency which is lower than that of the carrier of the signal *b*. As a result of this locking, the demodulated output signal *d* produces a distortion in the parts *nd*1, *nd*2, and *nd*3, and an abnormal jarring noise occurs in the reproduced sound.

On one hand, these actual noise parts *nd*1, *nd*2, and *nd*3 and the like occupy a time span in the order of 10 to 20 percent of the time during which noise is sensed by a human with a normal sense of hearing. Therefore, this noise has a time existence which is in the order of only a slight dropout experienced by a person with a normal hearing of a sound reproduced from an ordinary tape recorder. Accordingly, when the actual noise is attenuated, or even when it is not reproduced at all, it is almost impossible to sense the attenuation or cut off thereof by an ordinary sense of hearing.

Accordingly, the present invention is adapted to either attenuate a signal with respect to the above mentioned noise components and to demodulate and reproduce the same or not effect any demodulation and reproduction whatsoever.

Referring again to the block diagram in FIG. 1, the signal which has passed through the band-pass filter 16 is supplied, on the one hand, to the phase comparator 18 of the PLL 17 as described above and, on the other hand, to a phase comparator 21. Furthermore, the output signal of the voltage controlled oscillator 20 is phase shifted as it is supplied from a 90° phase shifter 22 to the above mentioned phase comparator 21. This phase comparator 21 acts as a synchronous detector and compares the phase of the signal from the band-pass filter 16 and the signal from the 90° phase shifter 22, and produces an output voltage corresponding to the phase difference.

The output signal of the voltage controlled oscillator 20 of the PLL 17 and the input signal of the PLL 17 always have a phase difference of 90° during the time when the PLL 17 is carrying out normal demodulation, with the input signals locked. Accordingly, the output signal of the 90° phase shifter 22 and the input signal of the PLL 17 have a phase relationship wherein they are of the same phase (or 180° opposite phase). The above mentioned phase comparator 21 constitutes the synchronous detector which compares the phases of the above mentioned two signals to determine the extent to which the two are of the same phase (or opposite phase) and produces an output voltage in accordance with the result.

The relationship between the value of this output voltage at this time and the phases of the above mentioned two signals can be selected at will. For example, this relationship can be so selected that, the output of comparator 21 is about zero volts when the signal from the band-pass filter 16 and the signal from the 90° phase shifter 22 are of opposite phase (i.e., the phase difference is 180°. When the phase difference between the two signals departs from 180° becoming less than or greater than 180°, the output becomes a positive voltage corresponding to this departure of the phase difference.

It will now be supposed that noise components *nb*1, *nb*2, and *nb*3 exist in the output signal of the above mentioned band-pass filter 16. The input signal *b* of the PLL 17 is as indicated in FIG. 2B. Then, the phase difference between the input signal of the PLL 17 and the output signal of the 90° phase shifter 22 decreases or increases from 180°. The phase comparator 21 produces as an output voltage, according to this phase difference.

The synchronous detector using phase comparator 21 thus detects a deviation of the angle-modulated wave component of a low-frequency and also a deviation of a high frequency which results from the noise component. Furthermore, the synchronous detector affords good dynamic characteristic, and discriminates between the noise component and the signal component.

Instead of the phase comparator 21 used in the instant example, a low-deviation detection circuit may be used. Furthermore, while the output of the voltage controlled oscillator 20 is used as one of the signals, a signal is obtained from the demodulated output of the PLL 17 which also may be used. In this case, when the angle-modulated wave deviates to a low frequency. The demodulated output of the PLL 17 is, of course, a signal corresponding to this deviation.

The output signal of the phase comparator 21 is supplied to the time constant circuit 23 and there caused to have a suitable time constant. In this time constant circuit 23, the charging time constant $\tau_1$ is made as small as possible, for example, of the order of 10 $\mu$sec. The discharging time constant $\tau_2$ is selected at a larger value, for example, of the order of 200 $\mu$sec. Accordingly, the time constant circuit 23 produces an output signal only during the period of approximately 200 $\mu$sec. corresponding to the noise parts *nb*1 (or *nb*2, *nb*3) of the input signal *b* for the PLL 17.

Figure 3:
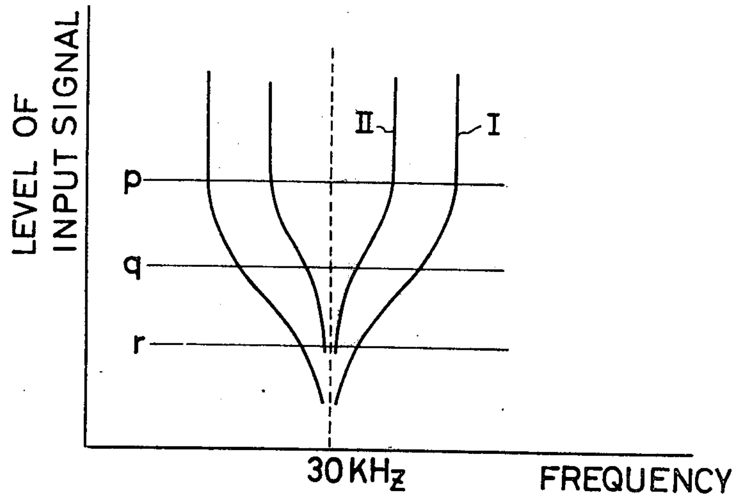
FIG. 3 is a graph indicating the lock range of a phase-locked loop in the system illustrated in FIG. 1.

The output signal of the time constant circuit 23 controls the loop gain control circuit 19 in the PLL 17. For this loop gain control circuit 19, a variable attenuation circuit, for example, is used. Its degree of attenuation is varied and controlled. As a result of the controlling of the loop gain control circuit 19 by the output of the time constant circuit 23, the loop gain of the PLL 17 decreases. As a consequence, the lock range of the PLL 17 becomes narrower as indicated, for example, by the curves I to the curve II in FIG. 3.

Figure 4:
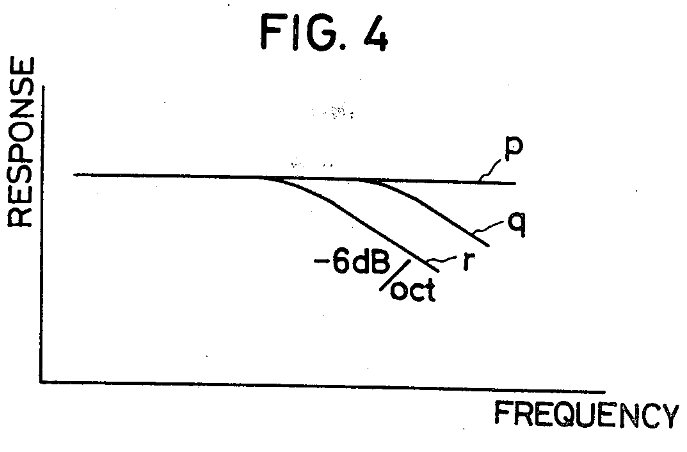
FIG. 4 is a graph indicating the demodulation frequency characteristic of the phase-locked loop in the system shown in FIG. 1.

As a result of the narrowing of the lock range of the PLL 17 in this manner, it becomes difficult for the PLL 17 to become locked to the input signal. In accordance with the level of the input signal, the levels of the medium and high frequency bands, particularly the high frequency band, are reduced as indicated by the frequency response characteristic of the demodulated signal of the PLL 17 in FIG. 4. The characteristics denoted by *p*, *q*, and *r* in FIG. 4 correspond to the input signal levels denoted by *p*, *q*, and *r* in FIG. 3.

Accordingly, as a consequence of the narrowing of the lock range of the PLL 17, the generation of noise in the reproduced signal is effectively suppressed since the medium and high frequency bands, in which noise components are especially distributed in great amount, are attenuated.

Furthermore, as another consequence of the narrowing of the lock range of the PLL 17, an unlocking may occur, whereby demodulation is not accomplished with respect to the noise component. This is equivalent to the output signal being greatly attenuated in all frequency bands. The generation of noise is effectively prevented.

Figure 5:
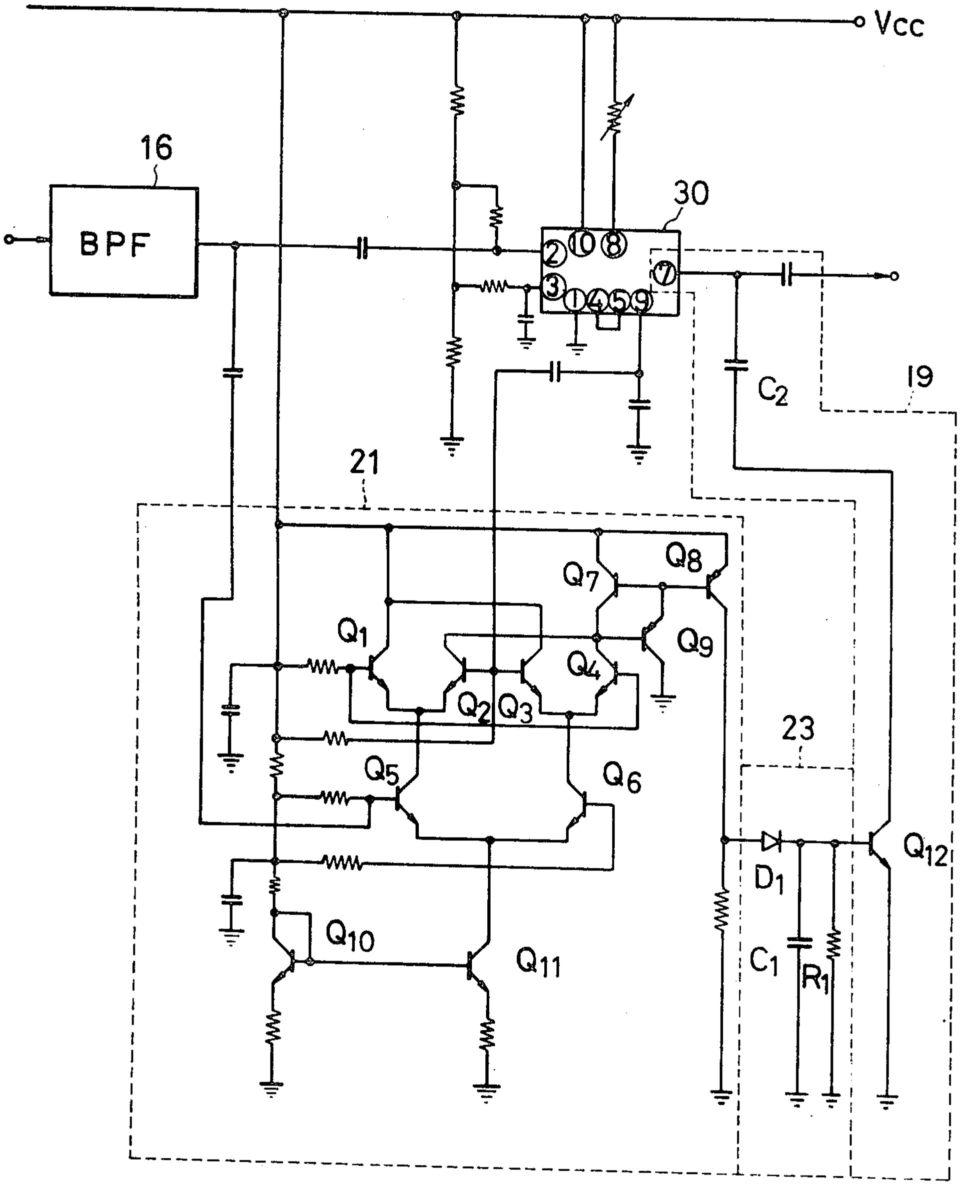
FIG. 5 is a circuit diagram showing one embodiment of a specific circuit arrangement of essential parts of the system shown in block diagram in FIG. 1.

One embodiment of a specific electrical circuit is shown by the block diagram in FIG. 1 as illustrated in FIG. 5. The parts which are the same as corresponding parts shown in FIG. 1 are designated by like reference numerals.

The phase comparator 18 and the voltage controlled oscillator 20 in the system shown in FIG. 1 are incorporated within a PLL 30 having the form of an integrated circuit (IC). By extracting the output of the voltage controlled oscillator from the ninth pin of the PLL 30, in IC form, a voltage controlled oscillator output phase-shifted substantially 90° is obtained. For this reason, the 90° phase shifter 22 in the system shown in FIG. 1 is not used in the circuit of the instant embodiment.

The phase comparator 21 is of known arrangement containing transistors Q1 through Q11. The time constant circuit 23 comprises a diode D1, a capacitor C1, and resistor R1. The above mentioned charging time constant $\tau_1$ is determined by the impedance value in the forward direction of the diode D1 and the capacitance value of the capacitor C1. The above mentioned discharging time constant $\tau_2$ is determined by the capacitance value of the capacitor C1 and the resistance value of the resistor R1.

The loop gain control circuit 19 comprises a series-connected circuit of a transistor Q12 and a capacitor C2. The output voltage of the time constant circuit 23 is impressed on the base of transistor Q12. This circuit 19 is connected between ground and the output side of the PLL 30 (in IC form). When a voltage is applied to the base of the transistor Q12, the impedance of this transistor decreases in accordance with that applied voltage, and the loop gain of the PLL decreases.

Furthermore, the phase comparator 21 in the instant embodiment may be combined in the IC of the PLL 30.

A second embodiment of the multichannel record disc reproducing system or apparatus according to the invention will now be described with reference to FIG. 6. Parts which are the same as corresponding parts in the system shown in FIG. 1 are designated by like reference numerals, and will not again be described in detail.

In the instant embodiment, a variable attenuation circuit 40 is provided in a stage following the FM/PM equalizer 25. Circuit 40 is adapted to be controlled with an output error signal voltage of the phase comparator 21 which signal voltage has passed through the time constant circuit 23. The variable attenuation circuit 40 attenuates the signal level of the frequency bands in which noise components are distributed, in large amounts in the demodulated signal.

In the instant embodiment, the variable attenuation circuit 40 is provided in the stage succeeding the FM/PM equalizer 25. It may be in any position provided that it is between a PLL 17*a* comprising the phase comparator 18 and voltage controlled oscillator 20 and the matrix circuit 15.

By the above described arrangement of the instant embodiment system, when a noise component exists in the input signal, the signal levels of the noise component bands are attenuated during the period thereof. Generation of noise is effectively suppressed.

Figure 7:
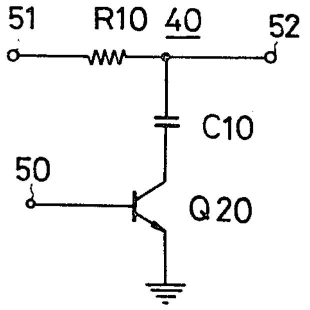
FIG. 7 is a circuit diagram of one example of an attenuation circuit in the system shown in FIG. 6.
Figure 8:
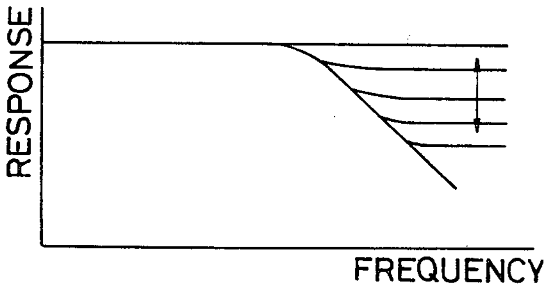
FIG. 8 is a graph indicating the frequency characteristic of a demodulated and reproduced signal for the attenuation circuit shown in FIG. 7.

An example of a specific circuit arrangement of the variable attenuation circuit 40 is illustrated in FIG. 7. The output voltage of the time constant circuit 23 is applied from a terminal 50 to the base of a transistor Q20, whereupon the impedance thereof is varied. This transistor Q20 is connected between from a junction between a resistor R10 and an output terminal 52 to ground, and is connected in series with a capacitor C10. Accordingly, transistor Q20 attenuates the high frequency band level of from demodulated signal which is sent through a terminal 51 by way of the resistor R10 to the terminal 52 together, as indicated in FIG. 8. With a decrease in the internal impedance *r* of the transistor Q20, the attenuation of the signal level increases, whereby the level of the high frequency band is attenuated.

Figure 9:
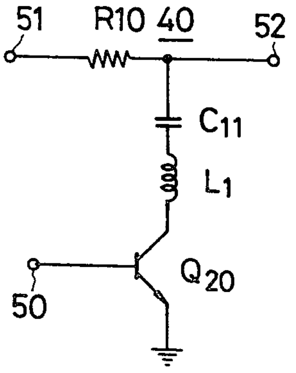
FIG. 9 is a circuit diagram of another example of an attenuation circuit in the system shown in FIG. 6.
Figure 10:
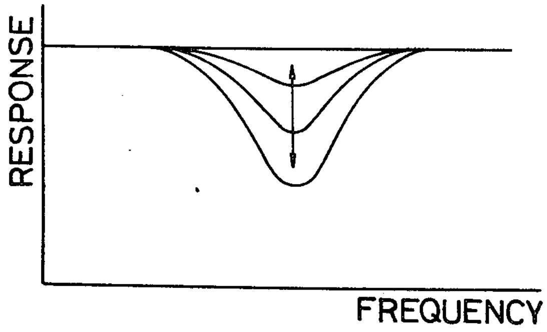
FIG. 10 is a graph indicating the frequency characteristic of a demodulated and reproduced signal for the attenuation circuit shown in FIG. 9.

Another example of the variable attenuation circuit 40 is shown in FIG. 9. In the instant example, a series-connected combination of a capacitor C11 and a coil L1 is employed in place of the capacitor C10, in the circuit of the example illustrated in FIG. 7. In the instant example, (FIG. 9) as a result of the variation of the impedance *r* of the transistor 20, the frequency characteristic of the signal passed through the variable attenuation circuit 40 becomes as indicated in FIG. 10. The signal level of the medium frequency band is attenuated. Accordingly, with respect to noises of a kind wherein the noise components are distributed in large amounts, especially in the medium frequency band, the use of the variable attenuation circuit of the instant example is effective. The smaller the impedance *r* becomes, the larger the attenuation degree of signal becomes.

Figure 11:
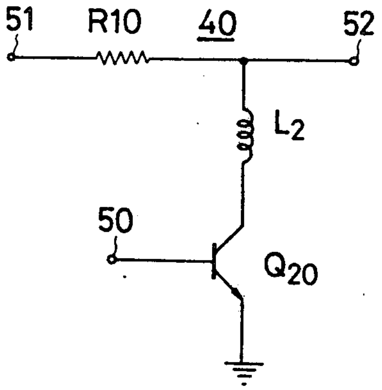
FIG. 11 is a circuit diagram showing still another example of an attenuation circuit suitable for use in the system shown in FIG. 6.
Figure 12:
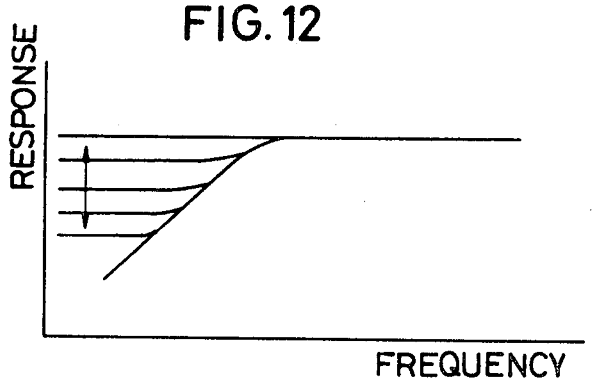
FIG. 12 is a graph indicating the frequency characteristic of a demodulated and reproduced signal for the attenuation circuit shown in FIG. 11.

In still another example of a variable attenuation circuit as shown in FIG. 11, a coil L-2 is employed instead of the capacitor C10 of FIG. 7. In the instant example (FIG. 11), as a consequence of the variation of the impedance *r* of the transistor Q20, the frequency characteristic of a signal passing through the variable attenuation circuit 40 becomes as indicated in FIG. 12. The signal level in the low frequency band is attenuated. The smaller the impedance *r* becomes, the larger the attenuation degree of the signal becomes. Accordingly, the use of the variable attenuation circuit of the instant example is effective with respect to noises of the kind wherein noise components are distributed in large amounts particularly in the low frequency band.

In this connection, a field-effect transistor (FET) may be used instead of the transistor Q20 in the examples illustrated in FIGS. 7, 9, and 11.

Figure 13:
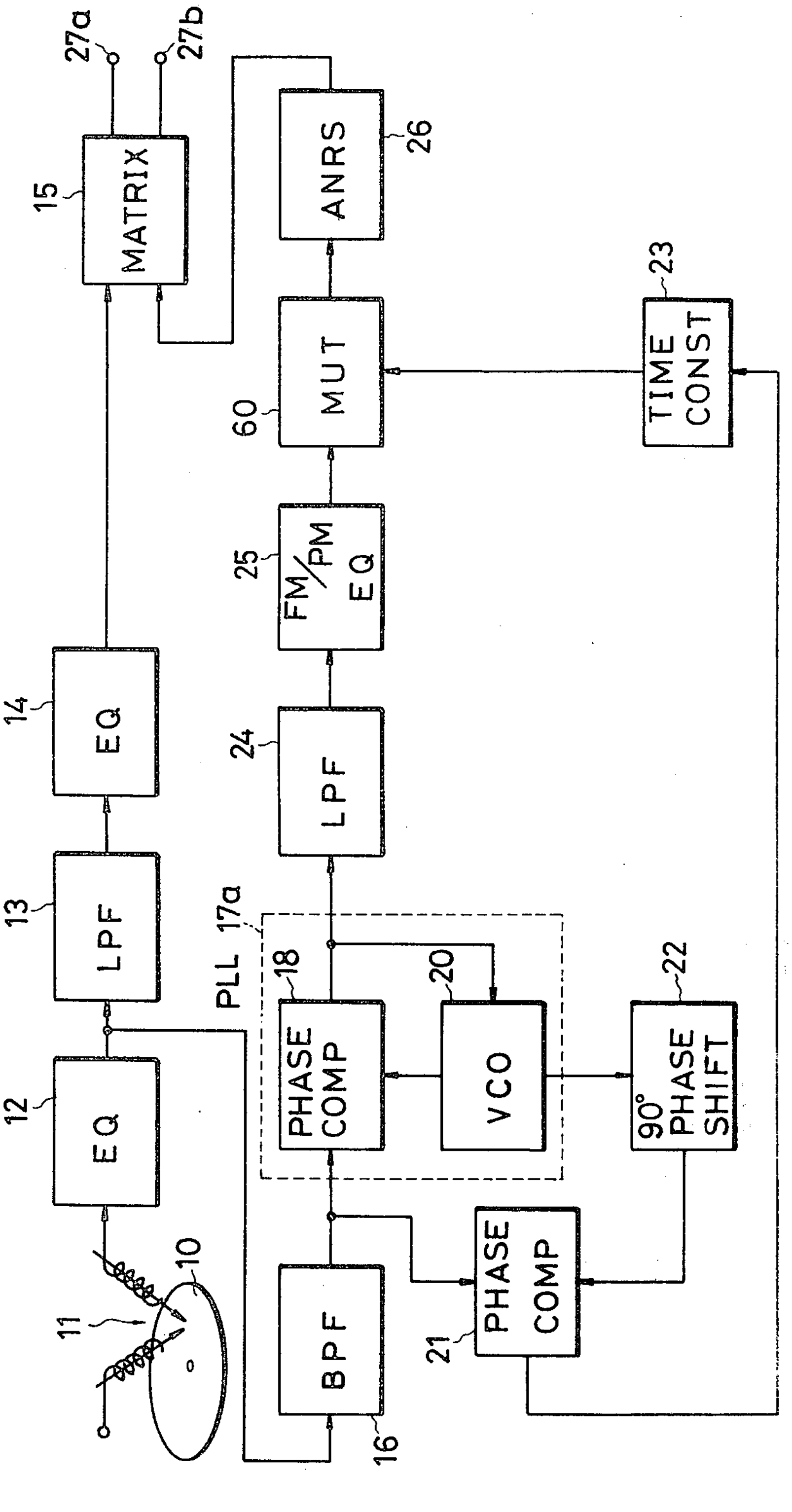
FIG. 13 is a block diagram showing the essential arrangement of a third embodiment of a multichannel record disc reproducing system or apparatus according to the invention.

A third embodiment of a multichannel record disc reproducing system according to the present invention is illustrated in FIG. 13. In FIG. 13, parts which are the same as corresponding parts in FIGS. 1 and 6 are designated by like reference numerals, and will not again be described in detail.

Figure 6:
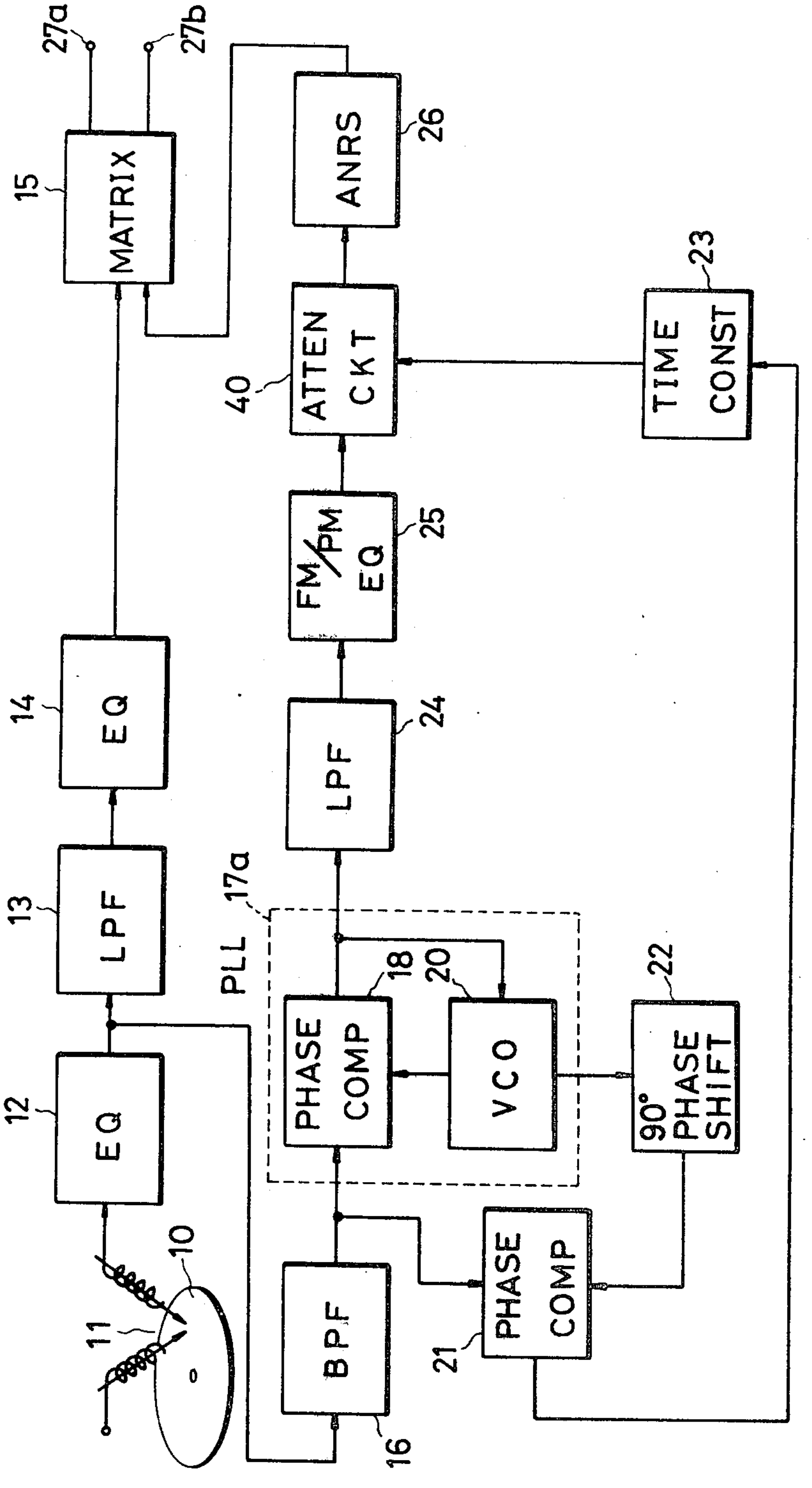
FIG. 6 is a block diagram showing the essential arrangement of a second embodiment of a multichannel record disc recording system or apparatus according to the invention.

In this third embodiment, a muting circuit 60 is provided in place of the variable attenuation circuit 40 in FIG. 6. This muting circuit 60 is operated by the output error signal voltage of the phase comparator 21 passed through the time constant circuit 23, and carries out a muting operation by cutting off the passage of the demodulated signal system, when there is a noise component in the input signal. This muting operation can impart large signal level attenuation over all bands. In this case, also, a generation of noise is effectively suppressed.

Further, this invention is not limited to these embodiments but variations and modifications may be made without departing from the scope and spirit of the invention.

What is claimed is:

1. A multichannel record disc reproducing system comprising:

a phase locked loop circuit means containing a phase comparator and a voltage controlled oscillator for demodulating an angle-modulated wave signal separated from a signal picked up from a multichannel record disc on which a direct wave signal and an angle-modulated wave signal are recorded in a multiplexed state, the output of said phase locked loop being a demodulated signal;

a synchronous detector means for comparing the phases of said angle-modulated wave signal and the output signal of said voltage controlled oscillator and operating when the phase difference of said two signals deviates from a predetermined phase difference to produce as output a voltage in accordance with the deviation of the phase difference from said predetermined phase difference; and attenuation means coupled to said phase locked loop for obtaining a demodulated output signal in which the level of at least a frequency band wherein a noise component is distributed has been attenuated in accordance with the output of said synchronous detector.

2. A multichannel record disc reproducing system as claimed in claim 1 in which said attenuation means comprises means operated responsive to the output of said synchronous detector to control the loop again of said phase locked loop circuit and for reducing the width of the lock range thereof responsive to said loop gain control means, whereby the demodulated angle-modulated wave signal is attenuated in a specific frequency band thereof.

3. A multichannel record disc reproducing system as claimed in claim 2 and means by which said phase locked loop circuit accomplishes demodulation of said angle-modulated wave signal by attenuating the high frequency band thereof.

4. A multichannel record disc reproducing system as claimed in claim 1 in which said attenuation means comprises means operated responsive to the output of said synchronous detector to control the loop gain of said phase locked loop circuit, means for reducing the width of the lock range of said phase locked loop circuit responsive to the said loop gain control means, and unlocking means for stopping the demodulation operation so that the output thereof is greatly attenuated and substantially not produced over all frequency bands.

5. A multichannel record disc reproducing system as claimed in claim 1 in which said attenuation means comprises a variable attenuation circuit controlled responsive to the output of said synchronous detector to attenuate the level of a specific frequency band of the demodulated output signal from said phase locked loop circuit.

6. A multichannel record disc reproducing system as claimed in claim 5 in which said variable attenuation circuit comprises a variable impedance element controlled by the output of said synchronous detector thereby to vary the internal impedance thereof and a capacitor connected in series with said element, and operates to attenuate the level of the high frequency band of said demodulated output signal.

7. A multichannel record disc reproducing system as claimed in claim 5 in which said variable attenuation circuit comprises a variable impedance element controlled by the output of said synchronous detector thereby to vary the internal impedance thereof and a series-connected combination of a capacitor connected in series with said element and a coil, and operates to attenuate the level of the medium frequency band of said demodulated output signal.

8. A multichannel record disc reproducing system as claimed in claim 5 in which said variable attenuation circuit comprises a variable impedance element controlled by the output of said synchronous detector thereby to vary the internal impedance thereof and a coil connected in series with said element, and operates to attenuate the level of the low frequency band of said demodulated output signal.

9. A multichannel record disc reproducing system as claimed in claim 1 in which said means comprises a muting circuit which is controlled by the output of said synchronous detector to attenuate said demodulated output signal greatly over all frequency bands thereby to substantially cut off the transmission thereof.

10. A multichannel record disc reproducing apparatus comprising:

a phase locked loop circuit means containing a phase comparator and a voltage controlled oscillator for demodulating an angle-modulated wave signal separated from a signal picked up from a multichannel record disc on which a direct wave signal and an angle-modulated wave signal are recorded in a multiplexed state;

a synchronous detector means for comparing the phases of said angle-modulated wave signal and the output signal of said voltage controlled oscillator and operating when the phase difference of said two signals deviates from a predetermined phase difference to produce as output a voltage in accordance with the deviation of the phase difference from said predetermined phase difference; and a circuit means responsive to said phase locked loop for obtaining a demodulated output signal in which the level of at least a frequency band wherein a noise component is distributed has been attenuated in accordance with the output of said synchronous detector.

11. A multichannel record disc reproducing system comprising:

phase locked loop means for demodulating an angle-modulated wave signal separated from a multiplexed signal picked up from a multichannel record disc on which a direct wave signal and an angle-modulated wave signal are multiplexed and recorded, said phase locked loop means comprising a phase comparator, a loop gain control circuit and a voltage controlled oscillator, said loop gain control circuit comprising means for decreasing a loop gain of said phase locked loop means corresponding to the level of a control signal;

phase shifting means responsive to said voltage controlled oscillator for generating an output signal having a phase difference of 90° with respect to the output signal of said voltage controlled oscillator;

synchronous detector means for generating an output signal responsive to a comparison of the phase of the angle-modulated wave signal separated from the signal picked up from the multichannel record disc with the phase of the output signal of said phase shifting means, said output signal corresponding to the phase difference; and time constant circuit means responsive to the output signal of said synchronous detector means for producing the control signal which controls said loop gain control circuit, said time constant circuit means comprising a diode and a parallel combination of a resistor and a capacitor, the parallel combination being connected to one electrode of the diode, the output signal of said synchronous detector means being applied to the other electrode of the diode, the control signal being taken from the junction of the diode and the parallel combination; a first time constant determined by the parallel combination being larger than a second time constant determined by the capacitor and the forward resistance of the diode.

12. A multichannel record disc reproducing system comprising:

phase locked loop means for demodulating an angle-modulated wave signal separated from a multiplexed signal picked up from a multichannel record disc on which a direct wave signal and an angle-modulated wave signal are multiplexed and recorded, said phase locked loop means comprising a phase comparator and a voltage controlled oscillator;

phase shifting means responsive to the voltage controlled oscillator for generating an output signal having a phase difference of 90° with respect to the output signal of the voltage controlled oscillator;

synchronous detector means for generating an output signal responsive to a comparison of the phase of the angle-modulated wave signal separated from the signal picked up from the multichannel record disc with the phase of the output signal of said phase shifting means, said output signal corresponding to the phase difference;

time constant circuit means comprising a diode and a parallel combination of a resistor and a capacitor, the parallel combination being connected to one electrode of the diode, the other electrode of the diode receiving the output signal of said synchronous detector means, an output signal being taken from the junction of the diode and the parallel combination, a first time constant determined by the parallel combination being larger than a second time constant determined by the capacitor and the forward resistance of the diode; and variable attenuation means responsive to the signal demodulated by said phase locked loop means for variably attenuating the demodulated signal, the attenuation of the demodulated signal being controlled responsive to the level of the output signal of said time constant circuit means which is applied to said variable attenuation means.

13. A multichannel record disc reproducing system as claimed in claim 12 wherein said variable attenuation means comprises a series combination of a resistor, a capacitor and a variable impedance element, means for applying the demodulated signal across said series combination, the output signal of said variable attenuation means being taken from the junction of the resistor and the capacitor, said variable impedance element decreasing its impedance corresponding to the level of the output signal of said time constant circuit means.

14. A multichannel record disc reproducing system as claimed in claim 12 wherein said variable attenuation means comprises a series combination of a resistor, a capacitor, a coil and a variable impedance element, means for applying the demodulated signal across said series combination, the output signal of said variable attenuation means being taken from the junction of the resistor and the capacitor, said variable impedance element decreasing its impedance responsive to the level of the output signal of said time constant circuit means.

15. A multichannel record disc reproducing system as claimed in claim 12 wherein said variable attenuation means comprises a series combination of a resistor, a coil and a variable impedance element, means for applying the demodulated signal across said series combination, the output signal of said variable attenuation means being taken from the junction of the resistor and the coil, said variable impedance element decreasing its impedance responsive to the level of the output signal of said time constant circuit means.

* * * * *